United States Patent
Kohan

[11] Patent Number: 5,851,328
[45] Date of Patent: Dec. 22, 1998

[54] WAFER DEFORMING COMPOSITE OPHTHALMIC LENS METHOD

[76] Inventor: George Kohan, 16139 Chief Dr., Hudson, Fla. 34667

[21] Appl. No.: 813,597

[22] Filed: Mar. 7, 1997

[51] Int. Cl.$^6$ ..................................................... B32B 31/28
[52] U.S. Cl. .................. 156/102; 156/275.5; 156/275.7; 156/273.7; 264/1.7; 351/166
[58] Field of Search ....................................... 351/177, 166; 264/1.7, 1.8; 156/99, 102, 273.7, 275.5, 275.7, 153, 295

[56] References Cited

U.S. PATENT DOCUMENTS

| | | | |
|---|---|---|---|
| 4,543,146 | 9/1985 | Petcen | 351/177 |
| 4,859,261 | 8/1989 | Ace | 156/102 |
| 4,969,729 | 11/1990 | Merle | 156/153 |
| 5,017,666 | 5/1991 | Crano et al. | 526/230.5 |
| 5,531,940 | 7/1996 | Gupta et al. | 264/107 |
| 5,552,090 | 9/1996 | Van Gemert et al. | 252/586 |

*Primary Examiner*—Michael W. Ball
*Assistant Examiner*—Michael A. Tolin
*Attorney, Agent, or Firm*—Pendorf & Cutliff

[57] ABSTRACT

Methods for quickly and inexpensively producing photochromic non-prescription (e.g., sunglasses, safety glasses, reading glasses, etc.), prescription, multifocal and progressive plastic optical quality eyeglass. The lenses are formed by a process wherein a thin wafer lens is deformed to assume the curvature of a base lens. Deformation may be by heat treatment and application of pressure while adhering the wafer lens against a base lens. The invention further concerns lenses produced by the methods. The lenses are characterized by an extremely rapid photochromic response.

20 Claims, 2 Drawing Sheets a b c d e

Fig. 3

WAFER DEFORMING COMPOSITE OPHTHALMIC LENS METHOD

FIELD OF THE INVENTION

The present invention is concerned with the production and/or modification of plastic/plastic or plastic/glass laminate lenses by a process of adhering a "wafer" lens to a base lens, usually a prescription lens.

Conventionally, such lenses are made by a process involving (a) determining the curvature of the base lens, selecting a wafer lens having a conforming curvature, and (c) adhering the mating surfaces to each other.

The present invention overcomes the requirement for stocking a full set of wafer lenses of various curvatures. The invention is based on the discovery that the curvature of a given wafer lens can be satisfactorily deformed during the adhesion process and adhered to any curvature base lens while in the deformed state, producing an optical quality lens with no noticeable distortion. Accordingly, it is now necessary to only stock wafer lenses in one generic curvature, such as a 6 base curve wafer lens, in order to be able to modify any curvature base lens when following the procedure according to the present invention, eliminating the need to stockpile a traditional complete selection of wafer lenses covering the range of available curvatures.

The invention makes it possible to quickly (in a matter of seconds) and inexpensively create bifocal, progressive prescriptions from stock lenses. The invention further makes it possible to convert a stock prescription or non-prescription lens into a photochromic or a tinted photochromic non-prescription (e.g., sunglasses, safety glasses, reading glasses, etc.), prescription, multifocal or progressive plastic or glass optical quality eyeglass.

The invention further makes it possible to modify the prescription of lenses taken directly from the frames of a client. Even scratched lenses can be returned to a like-new state by this process.

The invention further concerns lenses produced by the method.

The wafer lens and/or the adhesive used to adhere the wafer lenses to the prescription lens may include photochromic pigments, thereby producing photochromic lenses. Photochromic lenses produced by this process are characterized by an extremely rapid photochromic response.

BACKGROUND OF THE INVENTION

Photochromic ophthalmic lenses made of mineral glass are well known. Photochromic pigments have good compatibility with mineral glass. However, photochromic mineral glass lenses are heavy and have a slow photochromic reaction time, particularly in the change from dark lenses to light lenses.

Today however today most spectacle lenses are made from any of a variety of plastics or from plastic-glass composites. Plastics include acrylic, PPMA (a product of PPG-Pittsburgh Plate Glass) also known as CR-39, and Lexan (Polycarbonate made by General Electric). For example, U.S. Pat. No. 3,946,982 (Calkins) discloses a method of casting multifocal lenses. He does this by holding two mold portions together with a gasket, one of the molds having a recessed portion, so as to provide a bifocal effect. Liquid plastic is injected between the two mold portions, cured and cooled, thereby creating an entirely new lens. However, this is a slow, laborious and time consuming process.

Recently, attempts have been made to apply photochromic pigments to light-weight plastic lenses to render them similarly photochromic. However, for various reasons this objective has not been satisfactorily achieved with plastic lenses. One reason for the lack of success has to do with the chemistry of ethylene glycol diallyl dicarbonate, the most commonly used monomer for producing plastic ophthalmic lenses. This monomer is cast in a lens mold and polymerized with a catalyst such as isopropyl percarbonate. One might expect that a plastic lens made from such a monomer could be rendered photochromic simply by incorporating photochromic pigments into the monomer composition prior to casting the lens. However, in practice it was found that, following polymerization of the organic material, the photochromic pigments did not retain their photochromic property. Apparently, the catalyst required for the polymerization caused fixation or inhibition of the pigments. Thus, it has not been possible in practice to simply incorporate photochromic pigments into the monomer composition when making ophthalmic lenses from an organic material.

One approach to rendering plastic ophthalmic lenses photochromic involved embedding a solid layer of photochromic mineral glass within the bulk of the organic lens material. For example, U.S. Pat. No. 5,232,637 (Dasher, et al.) teaches a method of producing a glass-plastic laminated ophthalmic lens structure. A thin, flexible, plastic adhesive layer is applied to a glass element and a monomeric formulation is flowed onto the adhesive layer and cured to form a laminated lens blank. The adhesive layer is a thermoplastic urethane which may be preformed by extrusion as a thin sheet. The sheet may be in the order of 0.13 to 0.63 mm thick, preferably 0.375 to 0.5 mm thick. The sheet may be, by way of example, an aliphatic polyether type urethane available from Thermedics under the designation SG-85A. Other thermoplastic resins such as polyvinyl butyral, 1,4-butane diol, polyetherpolyol and aliphatic diisocynate may be used. However, due to problems with glass-plastic adhesion, differences in the respective thermal co-efficients of expansion, and due to contraction of organic materials during polymerization, such lenses exhibited stress fractures in production or could not stand up to extended normal handling by the consumer.

A variation on the glass-plastic composites is taught in U.S. Pat. No. 4,300,821 (Mignen). This patent teaches an ophthalmic lens made of organic material having at least one layer of photochromic mineral glass within its mass to impart photochromic properties to the lens. The photochromic mineral glass has a fibrous structure and may comprise a piece of woven fabric produced from fibers of photochromic mineral glass possessing a refractive index and coefficient of chromic dispersion which are equal to those of the constituent organic material of the lens. However, while such an approach may make it possible to mass-produce photochromic lenses, the approach can not be utilized for the small-scale customized production of prescription lenses on an as-needed basis. It would be cost prohibitive for a medium-sized operation to stock a large number of photochromic lenses of various prescriptions, in addition to the non-photochromic lenses, in order to be able produce photochromic lenses on demand.

Advances have recently been made on two fronts in materials and methods for the on-site production of prescription lenses: advances designed to reduce the amount of stock materials which must be carried on site, and advances in reduction of the time needed to produce the prescription lenses. However, none of these approaches has made it possible to carry only one single curvature of wafer lens for adhesion to any curvature base lens. Further, no approach has made it possible to transform stock prescription lenses to lenses of different prescriptions or to bifocals or multi-focal lenses in a matter of seconds, including the option of rendering the lenses photochromic. Further, none of the available methods permits the lens crafter to utilize simple wafer and stock lenses, yet offer a wide variety of photochromic properties, tinting, UV protection, scratch resistance, and other desirable properties. Further yet, none of the available methods or materials makes possible the provision of photochromic lenses having an extremely rapid photochromic response rate.

More specifically, one approach to on-site custom lens production involves casting an additional plastic layer onto a plastic lens blank. See, for example, in U.S. Pat. No. 2,339,433 (Staehle) disclosing a method of adding a correction to a molded plastic lens by adding a thin level of resin. U.S. Pat. No. 3,248,460 also discloses means for casting plastic lenses from thermosetting or thermoplastic materials wherein a plastic blank having significantly less curvature than required for the full intended prescription of the lens is used as a base. An additional layer of material is cast onto this base. The patent employs a conventional optical gasket to provide space between the plastic blank and the mold and to hold the resin material in the cavity created thereby. The additional layer of material changes the curvature of the resulting lens over the vast majority of its surface, thereby changing the prescription of the resulting finished lens to the power required. A disadvantage of this system is that the material must be cured by heat. Such a heat curing process requires heating over a period of more than 12 hours, thus making the formation of the lens a long, drawn-out process. A further obvious disadvantage is that photochromic lenses could not be produced from such materials and methods.

Others have tried to manufacture multifocal or progressive plastic lenses using a lamination technique. Such a technique joins a preformed plastic section, generally referred to as a wafer or wafer lens or veneer lens, to another cured plastic prescription lens. In all cases the curvature of the wafer lens must correspond to the mating curvature of the base lens, and thus the number of wafer lenses which must be maintained in stock corresponds to (a) the number of base lens curvatures to be matched times (b) the strengths of the corrections times (c) the various strengths of progressive or bifocal prescriptions [i.e., (a)×(b)×(c)] . A base lens is matched to a preformed wafer section defining a multifocal or progressive region and the conforming mating surfaces of these lenses are joined by an adhesive. See, for example, U.S. Pat. No. 4,940,205 (Rudd, et al.) teaching a method and apparatus for forming a laminated bifocal lens which includes selecting a frontal lens component having a bifocal element and bonding the frontal lens component to a rear lens component. The non-prescription frontal lens carrying the bifocal element is referred to as a veneer lens and the rear lens is referred to as the prescription lens. The arced inner surface of the veneer lens meniscus has the same curvature as the front surface of the prescription lens. To fill a prescription, a technician matches the desired frontal lens with a rear lens carrying the desired prescription base. The adhesive for bonding the two lens components is the same monomer used to cast the lens components. Accordingly, the curvature of the veneer lens must match that of the prescription lens, and no provision is made for incorporation of photochromic pigments.

As a somewhat different approach, see also U.S. Pat. No. 5,433,810 (Abrams) teaching a method and apparatus for lamination of composite eyeglass lenses. Front and rear lenses are laminated together by holding the front lens in an XY adjustable stage on a laminating axis, holding the rear lens in a predetermined position relative to the laminating axis, and moving the two lenses together on the laminating axis to spread an adhesive between them. Then, the adhesive between the pressed-together lenses is cured by UV radiation directed through the front lens before the lenses are removed from the laminator. The bonding process involves placing a curable adhesive on the concave interface surface of the front lens; pressing the convex interface surface of the rear lens against the adhesive in the front lens to spread the adhesive throughout the space between the two lenses; and curing the adhesive to bond the lenses together, forming a composite lens. The curvatures of the mating surfaces conform to each other, but the convex surface may have a slightly greater curvature, up to 0.25 diopter greater, in order to facilitate the spread of adhesive between the two lenses from the inside out (col. 3, line 34). While Abrams teaches an apparatus for aligning and laminating front and rear lenses to form a composite eyeglass lens, Abrams does not teach lens compositions or adhesive compositions, and does not address photochromic lenses.

Recently U.S. Pat. No. 5,462,698 (Kobayakawa, et al.) entitled "Photochromic Composition" addressed the problems associated with specific photochromic compounds which tend to be slow-acting or inactive when incorporated in plastic, and solved the problem by use of a resin compound having at least one epoxy group in the molecule as the resin for forming the photochromic lens. However, this solution to the problem has limitations and drawbacks. Kobayakawa, et al.) (a) is directed to forming a lens having photochromic compound dispersed throughout, (b) requires the presence of multiple types of photochromic compounds in combination, (c) requires the use of a polymerizable compound having at least one epoxy group to form the lens, (d) requires polymerization in a heat furnace, with polymerization taking from 2 to 40 hours, and (e) reports fading time to ½ density measured after exposure to 60 seconds averaging 3 minutes (Table 1). Kobayakawa, et al. thus uses specific materials and requires a long time to produce a slow acting lens.

More recently U.S. Pat. No. 5,531,940 (Gupta et al.) teaches methods for making optical plastics lenses with photochromic additives. According to a first embodiment of the invention, a casting resin having a low cross link density comprising polymerizable components (preferably including up to 50 wt % bisallyl carbonate) and photochromic additives, wherein all polymerizable components have a functionality not greater than two, is arranged between a mold and a lens preform and then cured. However, upon polymerization the resin has a low crosslink density and forms a soft matrix. This soft matrix is unsuitable as the outer layer for photochromic lenses. According to a second embodiment of the invention, the casting resin (but substantially free of photochromic additives) is arranged between a mold and a lens preform and then cured. The resin is then impregnated with photochromic additives. In a third embodiment, the layering resin containing a photochromic additive is provided on the surface of a mold and cured to a gel state. Then, a casting resin that is substantially free of photochromic additives is arranged between the coated mold and a lens preform and cured. According to a fourth embodiment, a casting resin that is substantially free of photochromic additives is provided on the surface of a mold and cured to a gel state. Then, a casting resin containing photochromic additives is arranged between the coated mold and a lens preform and cured. There is no discussion of photochromic rate of reversal, and the photochromic material is represented as being too soft to expose to the environment.

There is thus a need for a method for production of non-prescription or prescription ophthalmic lenses, which method would enable an optometrist to stock a small number of lenses, yet custom produce plastic lenses of any required prescription including bifocal and progressive lenses, and also capable of rendering the lenses photochromic, tinted, UV-protective, and/or scratch resistant as required by the customer.

SUMMARY OF THE INVENTION

It is an object of the present invention to provide methods for quickly and inexpensively modifying a base lens, generally a stock prescription lens, to a bifocal, multifocal, or progressive lens of a different prescription. The invention also makes it possible to produce photochromic non-prescription lenses (plano lenses, e.g., sunglasses, safety glasses, reading glasses, etc.), as well as prescription, multifocal, progressive or non-prescription plastic or plastic-glass laminate optical quality eyeglass.

It is a further object of the invention to produce lenses characterized by an extremely rapid photochromic response, i.e., a near complete photochromic transition in either direction in about 30 seconds or less.

It is a further object of the invention to reduce the quantity of materials which must be stockpiled in order to carry out the inventive process in a commercial setting, i.e., to be capable of modifying any of the conventional base lenses with a minimum of stock materials on hand.

It is a further object of the invention to provide a method for producing a photochromic lens without requiring casting an optical resin in a lens blank, which process can be carried out by an optometrist in a conventional setting in a matter of minutes.

It is yet another object of the invention to provide customized prescription or photochromic laminated bifocal lenses that are light weight, inexpensive and can be easily formed according to a given prescription from a relatively small number of component lenses maintained in stock.

Finally, it is an object of the invention to be able to conveniently repair scratched lenses to a like-new state in a short period of time.

These and other objects of the present invention have been accomplished by a method of forming a non-photochromic or photochromic lens according to the present invention, and to the lenses produced by the processes. One significant feature of the present invention is the treatment of an otherwise conventional wafer lens in a manner to render it sufficiently pliable and deformable so that it can be deformed under pressure, preferably during a simultaneous pressure deformation-adhesion step. The wafer lens can thus be laminated with deforming pressure onto a base lens which need not have the same curvature as the wafer lens. This is in contrast with the conventional techniques, wherein it had been considered necessary to match the curvature of the base and wafer lens in order to achieve a stress free bonding, or to have the curvatures so close to matching that the interstitial gap would be filled with adhesive during the adhesion step.

That is, previously the deforming of a wafer lens had not even been considered as an option. The reasons against deforming included concerns over (1) introducing stress which would render the laminate lens product less durable and liable to separation, (2) introducing imperfections, and (3) introducing a change in curvature which would require a further optical correction (i.e., it would have been expected that the precise optical corrections to be imparted by a wafer lens would not be maintained if the wafer lens was deformed). However, the present inventor discovered that optical could, in fact, be satisfactorily achieved if the curvature of the concave surface of the wafer lens is deformed evenly and to the same degree as the deformation of the curvature of the convex side of the wafer lens. That is, if care is taken to (1) relax the wafer lens, (2) select and apply the proper adhesive, (3) carefully adhere the wafer lens to the base lens with application of even pressure, and (4) allow the lens to re-harden as the adhesive is setting, the product is a lens of which the optical properties are the sum of the optical properties of the base lens and the original wafer lens.

Of course, it is also possible to heat deform the wafer lens with a traditional mold, and then to adhere the thus deformed wafer lens to the base lens. However, the present invention makes it possible to eliminate the need for lens molds by using the base lens as the perfect lens mold. Further, in the interest of convenience and expediency, the invention is preferably carried out in one step rather than two steps. Accordingly, it is preferred to simply combine the heat deformation and adhesion steps.

In accordance with the present invention it becomes possible also to impart photochromic properties to the prescription or non-prescription lenses. That is, either (1) a specially formulated photochromic pigment-containing adhesive is used to adhere the wafer lens to the base lens, or (2) a photochromic pigment is impregnated into the inside (contact side) of the base or wafer lens, or (3) a photochromic wafer lens is adhered to a base lens, or (4) another technique as described below or in previous technical literature is employed.

The photochromic layer, if any, is preferably provided near the front surface of the lens, i.e., on surface of the lens most exposed to UV radiation. As a result, the photochromic layer tends to have greater sensitivity to changes in ambient radiation. That is, many lenses, particularly those designed to be worn outdoors, include UV absorbers to block damaging UV rays from reaching the retina. UV absorbers naturally absorb UV radiation, and in doing so interfere with and retard the photochromic action of the lens wherein the photochromic pigments are designed to react to UV radiation. That is, photochromic pigments located behind UV absorbers are less likely to be effective, while the photochromic pigments arranged on the front surface of the lens according to one variation of the present invention are fully exposed to UV radiation and are highly sensitive and reactive. Of course, the present invention is not limited to such a construction, and in certain cases, such as the case of having an uneven bifocal lens front surface, it may be more advantageous to adhere a photochromic wafer lens to the back surface of the base lens.

The present invention utilizes a very thin wafer lens (the term "lens" as used herein is intended to include both corrective and non-corrective lenses), preferably between 0.25 mm and 2.0 mm, more preferably between 0.5 mm and 1.5 mm in thickness. The manner in which the wafer lens is adhered to a stock base lens as conventionally stocked by any retailer of eye glasses differs from the conventional process primarily in that, in the present invention, the wafer lens is treated to render it pliable during the adhesion process.

The lamination process according to the present invention makes it possible to create every possible prescription, to optionally tint lenses, and to optionally render lenses photochromic. The inventor has discovered how to incorporate photochromic pigments within the adhesive layer to create photochromic composite lenses without inhibition of the photochromic materials. The problem of photochromic pigments gassing out or leaching out through coating materials is also solved, since the photochromic pigment is sealed in between the wafer lens and the stock lens.

In one embodiment of the invention a photochromic layer may be provided on the back (concave) surface of the lens rather than on the front surface, and the wafer lens applied to the back surface of the lens. This has the advantage of ease of forming an even coating layer, particularly in the case of bifocals where there is a sharply uneven front surface to the lens. That is, with certain coating techniques the photochromic resin may tend to aggregate in crevices or thin out around promontories. To ensure an even photochromic coating layer, and even wafer lens adhesion, the photochromic material (adhesive or wafer lens or both) can simply be applied to the relatively even back surface of the lens.

The main advantage of the present invention lies in the ability to take stock lenses of any power and make them into bifocals or progressive (no line) bifocals or simply be made photochromic in very little time and therefore saving an very significant amount of money per lens. Further, it is possible herewith to create bifocals from stock polycarbonate lenses in about 20 seconds using a flash curing process and the same adhesion process and wafer materials as described below.

In contrast to traditional lens casting methods, the methods of the present invention provide lenses relatively quickly and at significantly less cost. Using ultraviolet light curing, curing requires approximately 10–20 seconds, no surfacing is required, and the entire process including edging and finishing may be completed in 30 minutes or less. Thus, the present invention provides means for producing optical quality multifocal and progressive photochromic lenses in approximately ½ hour or less, starting with any of an array of stock lenses and, depending upon the embodiment, wafer lenses, and photochromic or non-photochromic adhesive, and ending with the finished lens in the frame. This allows delivery of a full selection of prescription lenses from small stocks upon request and without having the patient wait a significant time. This is obviously a tremendous commercial advantage.

BRIEF DESCRIPTION OF THE DRAWINGS

In order to facilitate an understanding of the invention, the invention will be discussed with reference to the drawings, wherein there is shown.

DETAILED DESCRIPTION OF THE INVENTION

In manufacturing lenses, and particularly lenses for eyeglasses, the use of plastics is desirable due to their light weight and durability. Plastic lenses also provide relatively economical vision correction. Methods for producing plastic base lenses of various prescriptions are well known and need not be further described herein. Wafer lenses are becoming more widely available, but in consideration of their importance to the present invention wafer lenses will be discussed in greater detail below.

In accordance with the present invention, a pre-manufactured polymeric lens wafer, preferably a 6 base curve having a thickness of from 0.5 to 1.5 mm, is adhered to a pre-manufactured polymeric stock lens to produce the finished lens. Except when intending to form non-prescription eyewear (i.e., sunglasses, safety glasses, etc.), the preformed stock lens will have a predetermined lens correction (i.e., curvature or prescription) at is optical center. The preformed stock lens is preferably a finished lens (having a curvature or correction on front and back surfaces) but may also be a semi-finished blank lens (having a curvature or correction on only one surface).

The wafer lens may be any of the plastic (organic) polymer lenses conventionally available or as disclosed in the patents discussed in the background or detailed sections of the present application, the disclosures of which are incorporated herein by reference.

By adhering a wafer lens containing an optical segment or other multifocal or progressive region onto the surface of the stock lens, myriad lens designs can be achieved quickly and inexpensively. The wafer lens containing the multifocal or progressive region can be adhered onto the preformed lens with a liquid or a semi-solid adhesive. The adhesive may be selected from among the wide variety of available conventional (i.e., non-photochromic) adhesives, but may also be a photochromic adhesive as discussed in detail below.

The invention is not limited to any specific thickness of the lens wafer or rigidity of material, and the practitioner in the art having the present disclosure before him can easily determine thickness. If very thin, the wafer lens becomes flexible and difficult to handle and could become warped. If too thick, the wafer lens unnecessarily increases the thickness of the final lens, takes longer to reach deformation temperature, and becomes more difficult to deform to a form-fitting shape. Thus, for practical as well as commercial reasons, the thickness of the lens wafer is such as to permit handling without requiring undue care.

The polymerizable composition for forming the wafer lens will now be discussed in greater detail.

Polymerizable Compositions

The most common monomer utilized to produce either or both of the wafer and stock optical plastic lenses is diethylene glycol diallyl carbonate (DAC), marketed by AKZO Chemicals, Inc. of Dobsferry, N.Y. and PPG Industries, Inc. of Pittsburgh, Pa. under the trademarks NOURYSET 200™ and CR-39™, respectively. This monomer is widely accepted due to the clarity, strength, impact resistance, resistance to discoloration, and resistance to physical warping or distortion of products made therefrom. However, the present invention is not limited to this composition. U.S. Pat. No. 5,422,046 (Tarshiani, et. al.) teaches a method for casting plastic lenses having a refractive index higher than the lenses made of the conventional DAC monomer, and such lenses are within the contemplation of the present invention.

The present invention contemplates any other preformed "plastic" base or wafer lens regardless of the composition or manner in which such lens was formed. As used herein a "plastic" lens is simply one fashioned from optical quality resin materials. Such materials include without limitation mixtures containing allyl diglycol carbonates (such as "MasterCast 1" and "MasterCast 2" which are trademarks of Vision Sciences, Monrovia, Calif.; and "CR-39" which is a trademark of PPG Industries), allylic esters such as triallyl cyanurate, triallyl phosphate, triallyl citrate, diallyphenyl phosphonate, acrylic esters, acrylates, methyl, allyl and butyl methacrylates, polycarbonates, styrenics, LEXAN, polyesters such as those formed of ethylene glycol maleate, and other liquid monomer/polymer materials having high indices of refraction (such as HiRi which is a trademark of PPG Industries). Preferred resin compositions include allyl diglycol carbonates, allylic esters, triallyl cyanurate, triallyl phosphate, triallyl citrate, diallyl phenyl phosphonate, acrylic esters, acrylates, methyl methacrylate, allyl methacrylate, butyl methacrylate, polycarbonates, styrenics, LEXAN, polyesters, high index plastics, medium index plastics, urethanes, epoxies and silicones.

It is however possible to use a wide variety of UV-polymerizable monomers for preparing the wafer lens and stock lens used in the present invention. It preferred that the liquid monomers comprise at least one ethylenic unsaturated compound having at least two unsaturated groups per molecule. It is most preferred that the liquid monomers further comprise at least one polythiol compound having at least two thiol groups per molecule.

Typical examples of the unsaturated ethylenic compounds include ethylene glycol dimethacrylate, proplylene glycol dimethacrylate, trimethylene glycol dimethacrylate, tetramethylene glycol dimethacrylate, polyethylene glycol dimethacrylate, trimethylolpropane triacrylate, pentaerythritolpropane trimethacrylate, ethoxylated bisphenol A diacrylate, 1,6-hexanediol dimethacrylate, urethane diacrylate, epoxy diacrylate, eiallyl phthalate, and divinyl benzene.

Examples of polythiol compounds include 1,2,3-trimethylolproplane tri(thioglycolate), pentaerythritol tetra (thioglycolate), pentaerythritol tetra(3-mercaptopripionate), 1,2,3-trimethylolproplane tetra(3-mercaptopripionate), thioglycerol, dithioglycerol, trithioglycerol, dipentaerythritol hexa(2-mercapto acetate), and 3,4,5,6-tetrachloro-1,2-dimercapto benzene.

Many different ratios and proportions of monomers may be used in formulating the polymerizable composition. In one composition, ethylenic unsaturated compounds having at least two unsaturated groups per molecule comprise about 60–99.995% by weight of the polymerizable composition, polythiol compounds having at least two thiol groups per molecule comprise about 0 to 40% by weight of the composition, and photoinitiators comprise about 0.005 to 0.5% by weight of the composition.

According to current manufacturing processes, the monomer composition is fixed with free radical initiator, such as diisopropyl peroxy decarbonate. The photoinitiator is not particularly limited and may be, e.g., 1-hydroxy-1-cyclohexyl phenyl ketone, 2-hydroxy-2,2-dimethyl acetophenone, benzoin, benzoin methyl ether, benzoin propyl ether, benzoin isobutyl ether, 2,4-dihydroxy benzophenone, benzophenone, benzyl, and 2,4,6-trimethylbenzyl diphenyl phosphineoxide.

Molding and Polymerization

To manufacture a wafer lens or base lens from the monomeric composition, the lens forming materials are injected between, for example, a pair of glass mold shells or sections that are sealed by a gasket and held together by a spring clip or other suitable fastener. One mold shell has a molding surface having the profile of the front face which is to be obtained for the desired ophthalmic lens. The molding surface is generally concave for forming the convex outside surface of the lens. The mold shell is preferably made of glass, and in particular toughened glass. However, molds can be made from any material which will provide an optimum quality surface when used for casting such as, Crown Glass or Electro-Formed Nickel. Methods of making molds and for fastening such molds for use in accordance with the present invention are well known in the art and need not be described herein.

To cast the wafer lens, an optical resin monomer may be injected or dispensed into the mold. The wafer lens can even be produced from a material traditionally used to hardcoat lenses such as described in U.S. Pat. No. 4,758,448 or 4,544,572, incorporated herein by reference, thus providing not only the desired correction but also providing a durable surface. Hardcoat materials can also be blended with other resins, or the lens can be a composite of high index plastic materials and more scratch resistant materials.

The methods of the present invention can be used to add a multifocal or progressive region to the front of the base lens surface, the back of the base lens surface, or both. Preferably, for bifocal prescriptions, the wafer lens is used to change the curvature of the base lens over only a small portion of a surface of the preformed base lens to form an "optical segment". However, the methods of the present invention can be used to form lenses of almost any prescription including multifocal or progressive optical configuration including without limitation bifocals, trifocals and progressive lenses.

It is also possible to produce a wafer lens that does not alter the optical properties of the lens, but merely serves as an external shell for retaining photochromic adhesive materials within the lens, or for repairing a scratched or scuffed lens surface.

The charged mold assembly is then heated or, more preferably, exposed to ultraviolet radiation to cure the resin. The ultraviolet light used in the curing process can be selected from any suitable source, including low, medium or high pressure mercury lamps, laser, xenon, luminescence such as fluorescence or phosphorescence, and the like. Specific examples of ultraviolet light sources include a fluorescence Spectroline Model XX-15A, made by Spectronics Corporation of Westbury, N.Y. This light source generates most spectra output from 340 to 380 nm.

Separation of molds from the resultant lens wafer or stock lens blank can be facilitated by putting the assembled apparatus on ice or in some other cold source (e.g. FREON). The exposure to cold causes the resultant lens and molds to contact and pull away from each other such that the components can be more easily separated.

Reversible Photochromic Compounds

Reversible photochromic compounds (i.e., compounds which darken when exposed to intense sunlight or UV radiation, and revert to a colorless state when not irradiated), hereafter simply referred to as photochromic compounds, which can be used in the present invention include any reversible photochromic compounds as employed in this art, including for example napthopyran compounds and other photochromic compounds as taught in U.S. Pat. Nos. 5,458,815; 5,458,814; 5,466,398; 5,384,077; 5,451,344; 5,429,774; 5,411,679; 5,405,958; 5,381,193; 5,369,158; 5,340,857; 5,274,132; 5,244,602; 4,679,918; 4,556,605; and 4,498,919, the disclosures of these patents being incorporated herein by reference.

In accordance with the present invention, the layer of photochromic pigments is preferably provided closer to the front face of the ophthalmic lens than to the rear face, so that the ultraviolet radiation reaching the photochromic layer has retained as much of its energy as possible and the external radiation can have the maximum effect on the photochromic pigments present in the layer.

Furthermore, while UV absorbers may conventionally be added to either the wafer lens, the stock base lens or the adhesive layer, in order to obtain the rapid photochromic reaction rate according to the present invention, any agent which is capable of filtering the ultraviolet rays as preferably not incorporated externally of the layer containing the photochromic pigments, but is either mixed into the layer containing the photochromic pigments or is provided inside the layer containing the photochromic pigments. Ultraviolet curing also allows use of tinting agents in the photochromic layer which would be otherwise be decomposed or volatilized if a thermal curing processes were employed. If UV curing is used, in most cases, tinting agents can be added to the photochromic adhesive layer before curing and incorporated relatively uniformly into the resulting photochromic layer.

The photochromic material may alternatively be transferred to the stock base lens using an impression transfer technique wherein a plastic film is coated with photochromic material, dried and then applied against or adhered to the lens.

Plastic Films

A variety of plastic films may be utilized for transference of photochromic compounds, but the most readily available films is comprised mainly of polyethylene. Polyethylene can be easily blended or coextruded to produce various extensibilities, controlled stretch, and strength. Today most films are multilayer materials, with the overall properties of films being determined by one or more layers of polymer, and the additives, such as cling agents, tackifiers, or slip agents.

There are two main varieties of polyethylene: low density (branched) and high density (linear). These varieties have low levels of stretch. LDPE is produced by the high pressure polymerization of polyethylene, and has a density of 0.91–0.92 g/cc. LDPE is highly flexible. LDPE may also be formed by bulk or solution methods. HDPE is produced by two methods: (1) coordination polymerization of the monomer by triethyl aluminum and titanium trichloride (Ziegler-Natta catalyst), and (2) polymerization with the help of metal oxide catalysts such as chromium or molybdenum oxides. HDPE has a density as high as 0.96 g/cc, and has high tensile strength and stiffness. HDPE is denser because the more regular chain structure allows closer chain packing and a higher degree of crystallinity.

LLDPE (linear low density polyethylene) is actually a copolymer of ethylene and 1-butane (with lesser amounts of 1-hexene and higher 1-alkanes to vary the density) manufactured with Ziegler-type catalysts. LLDPE has high levels of stretch an strength. More recently, VLDPE (very low density polyethylene) has been developed.

Other types of film materials include polyvinyl chloride, polyvinyl alcohol, ethylene vinyl acetate, and acrylics, and blends. Any type of soft, pliable plastic film can be used for this application. A particular embodiment would be the use of low density polyethylene which is soft enough so that the film will take the shape of the lens curvature upon application of a small amount of hand pressure.

Photochromic Adhesive Material

The layer containing photochromic adhesive material is actually a mixture of two functional components:

(1) a component comprising photochromic pigment dispersed in a monomeric composition which acts as a solvent and is selected so as not to inhibit the photochromic properties of the photochromic pigment following polymerization, and (2) a polymerizable composition which imparts adhesive properties for adhering the adhesive layer to the lens blank (or, so state this another way, to adhere two lenses to each other to form the composite lens). The two components are preferably not mixed until immediately prior to coating.

For example, as the first component, a styrenic monomer has been found to work well, preferably styrene, vinylbenzene, phenylethylene or cinnamene or mixtures thereof. The monomer functions as a solvent in which to dissolve or disperse the photochromic pigment, optionally in combination with other solvents. The amount of photochromic dye dissolved in the styrene is no critical and can easily be determined by the person of ordinary skill depending upon the chemical solubility of the photochromic dye and the specific solvent.

The second composition, which imparts adhesive properties for ensuring good adhesion to the stock base lens blank is preferably comprised primarily of tripropylene glycol diacrylate, optionally modified with photoinitiators, catalysts, etc.

Preferably, the mixed photochromic and adhesive layer, following polymerization, is very thin (preferably 0.025–0.5 mm) to promote rapid curing and decrease the probability of developing stress and distortion in the resulting finished lens.

Further satisfactory adhesives include cements known as Norland Optical Adhesive Type 68 and Type 72 (NOA 68, NOA 72), manufactured by Norland Products, Inc. The cements are supplied as a viscous liquid and are rapidly cured by exposing to a UV source. NOA 72 has exceptional curing properties when exposed to long wave UV light.

Yet another adhesive which may be preferably employed is the UV-curable cement known as Norland Optical Adhesive Type 61 (NOA 61), manufactured by Norland Products, Inc. NOA 61 is a clear, colorless, liquid photopolymer that will cure remarkably rapidly when exposed to UV energy. This adhesive has excellent clarity, low shrinkage, and slight flexibility, all desirable characteristics for purposes of the present invention. Although this adhesive has conventionally been employed for adhering glass prisms and lenses, it has been surprisingly found by the present inventor that this adhesive, when used in the manner of the present invention, has good adhesive properties to acrylic, polycarbonate, and CR-39 type plastics, yet does not inhibit or interfere with photochromic pigments. NOA 61 is cured by ultraviolet light with maximum absorption within the range of 350–380 nanometers. The recommended energy for full cure is 3 Joules/cm$^2$ within these wavelengths. Curing may be done in two steps, the first being a precure of about 10 seconds in duration, merely to set the bond and allow the lens to be moved without concern about changing alignment.

Yet further suitable adhesives are produced by Dymax Corporation of Torrington, Conn. under tradenames DYMAX LIGHT WELD, ULTRA LIGHT-WELD, and MULTI-CURE. These adhesives are curable by UV light in the range of 275–354 nanometers, and are a polyurethane oligomer mixture, for example, a mixture comprising polyurethane oligomer (26–36%), first high-boiling methacrylate (22–32%), second high-boiling methacrylate (27–38%), acrylic acid (1–5%; cas 79-10-7), photoinitiator (1–6%, CAS 947-19-3), and aliphatic amide (5–15%, CAS 2680-03-7). When used in the present invention, two 15 watt fluorescent black lights can fully cure the polymer in about 25 minutes.

Yet further adhesives include products by Loctite Corporation of Newington, Conn., such as LITETAK #375, a tack free surface curing adhesive to be cured under UV light of about 365 nanometers. Preferred full cure time with this adhesive is about 30 minutes.

Whatever adhesive is selected, when mixing with photochromic pigments the adhesive should be chosen such that upon curing the adhesive will (1) harden, (2) bond with the wafer and the stock base lens, and (3) not inhibit the photochromic pigments. Preferably the adhesive material will form intermolecular bonds with the material of the preformed lenses.

Obviously, with conventional laminate lenses where photochromic pigments are not used, the same monomeric compositions as used for forming the lenses are preferably employed as adhesives for adhering the wafer lens to the stock base lens. However, as discussed above, due to the incompatibility between photochromic pigments and monomeric compositions used for forming lenses, the photochromic pigments are not dispersed directly in the lens forming monomers to provide the lens adhering adhesive.

The coated amount of photochromic pigment can be any desired amount depending upon the desired final appearance and light transmissivity characteristics of the lens. When prepared according to the present invention, the photochromic pigment is not inhibited following curing of the adhesive. It is surprising that the provision of the photochromic pigment in the adhesive layer results in an extremely rapidly photochromic reaction.

Pressure-Deformation Adhesion Step

Figure 2:
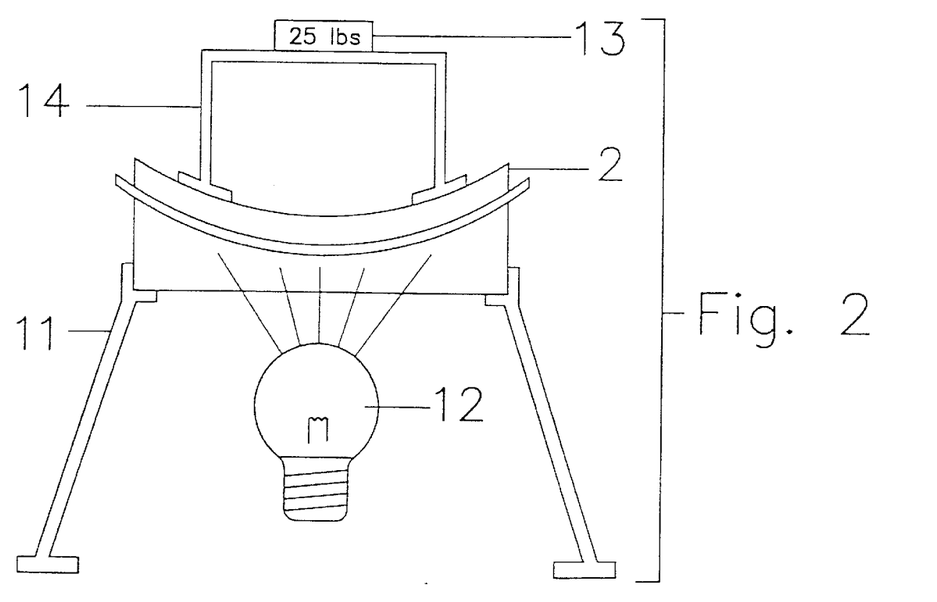
FIG. 2 corresponds to FIG. 1 but in the pressure-deformation-adhesion step, with wafer lens sandwiched between mold and prescription lens, with photochromic adhesive adhering wafer to prescription lens, and showing wafer lens deformed under pressure to conform to prescription lens.
Figure 3:
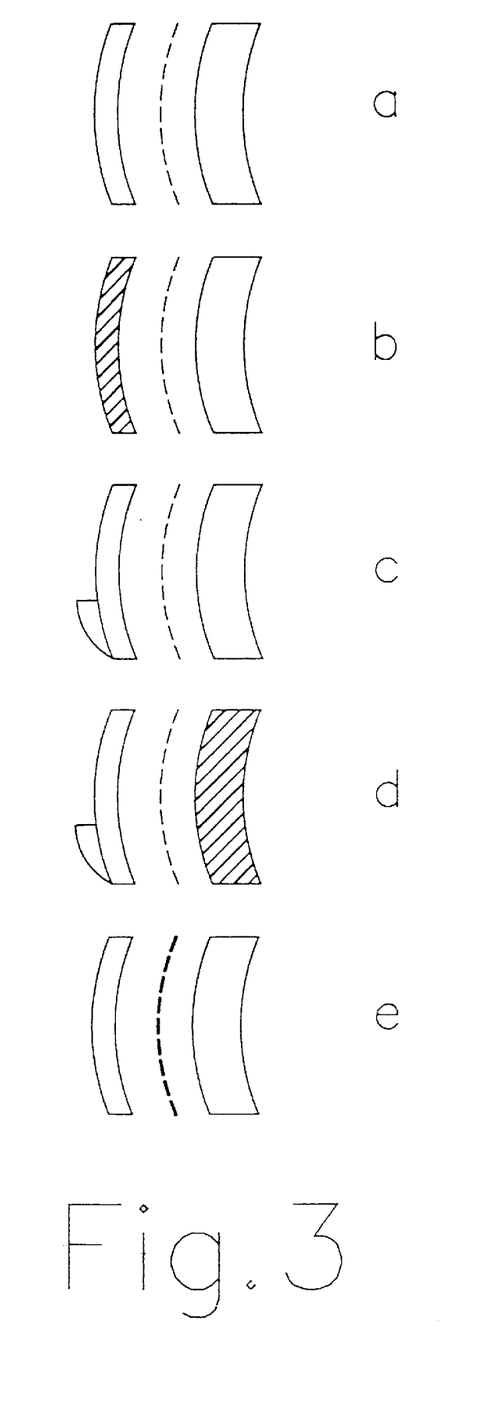
FIG. 3 shows various embodiments contemplated by the inventor, including (a) clear wafer and clear base lens; (b) photochromic wafer and clear base lens; (c) bifocal wafer and clear base lens; (d) clear wafer and photochromic glass base lens; and (d) clear wafer, clear base lens, and photochromic adhesive.

In the step of forming the laminate or composite lens, the wafer lens 1 is placed on top of a mold 10 preferably oriented generally horizontally to present a saucer-like appearance with concave side facing upwards. The wafer lens is heated to about 200 degrees F. for between 2–5 minutes to soften the lens and render it more pliable. A small amount of the adhesive 3, which may be photochromic according to the present invention, is then placed in the center of the lens. The preformed stock base lens 2 is cleaned with alcohol as conventional in the industry, and the clean base lens is placed in the on top of the lens wafer, with adhesive sandwiched therebetween. A force of between 25–45 pounds is applied downwards against the top of the base lens, as a result of which (1) adhesive 3 is caused to spread over the entire surface between the lenses 1, 2, and (2) the wafer lens 1 is caused to deform between the mold 10 and the stock base lens 2. Only a thin layer of adhesive as shown in FIG. 2 remains between the lenses 1, 2. The lenses are held tightly together during the adhesion/curing step as discussed below.

Although optical segments can be placed in any location on the lens, for normal applications, the optical segment should be properly located to avoid adverse prismatic effects. Optimally, an optical segment should be positioned approximately 1.5 mm left or right and 3–5 mm down from the optical center of the lens for normal eyeglasses. In certain applications, such as workman's glasses for close vision above the wearer's head, the optical segment can be optimally located approximately 1.5 mm left or right and 3–5 mm above the optical center of the lens. Other locations of the optical segment can also be used a long as the optical center and the segment are properly aligned.

The optical center can be moved or displaced by physically moving the optical center of the preformed lens to align with the desired location just above the edge of the multifocal region in the case of a multifocal lens or to be proper mold position in the case of a progressive lens, then adhering two lens surfaces.

In some lens designs adjustment must be made to accommodate astigmatism in the prescription of the finished resulting lens. In such cases, the preformed lens and wafer lens must be rotated with respect to each other to a degree corresponding to the proper astigmatic axis. The preformed lens and wafer lens can either be contacted at the proper angle or can be rotated with respect to each other after contact. The wafer lens and/or preformed lens can optionally be provided with approximate markings for determining the proper astigmatic axis. Alternatively, the wafer lens and preformed lens can be assembled within or on a circular protractor which serves to align the astigmatic axis and to hold the assembly in place.

Once the lenses are assembled the adhesive resin material must be cured to harden and bond with the lens surfaces. The resin material may be cured in any manner appropriate to the composition of such material. Most materials can be cured by exposure to heat or ultraviolet radiation ("UV"). Other curing methods may including without limitation ultrasound, infrared, microwave and other forms of radiation. Thermal initiators (such as diisopropyl peroxydicarbonate) and/or UV initiators (such as 2-hydroxy-2-methyl-1-phenyl-propan-1-one or 1-hydroxycyclohexylphenylketone)are mixed with the optical resin material before it is used.

In view of the thermal deformation process to which the wafer lens is subjected, the use of a thermal curable adhesive is not preferred since it is preferred to delay the onset of curing of the adhesive until after the wafer and base lens are in position against one another. Thus, it is preferred to use a thermal treatment for softening the wafer lens, followed by a UV curing treatment step for curing of the adhesive.

Suitable UV light sources include those manufactured by Phillips Corporation and identified as TL/10R/UVA reflector lamps, HPM high pressure halide lamps, HPA medium pressure metal halide lamps and HPR high pressure mercury vapor lamps. In preferred embodiments, the UV source (300–450 nm) is applied during the curing process until the resin hardens sufficiently (approximately 5–30 seconds). In some cases, the lenses to be cured are placed onto a turntable for rotating the lenses through the stream of incident radiation in order to achieve more even curing and maximizing the number of lenses which can be cast within a given area. Other appropriate UV light sources and conditions for exposure will depend upon the resin composition employed and will be apparent to those skilled in the art.

Photochromic Base Lens

The base lens may be a photochromic glass base lens as conventionally known, or may be a plastic photochromic lens as developed by the present inventor. The clear lens is cast from a composition comprising a major proportion tripropylene glycol diacrylate such as that available under the tradename SR-306 from The Sartomer Company. The composition also includes from 0.3 to 1.0, preferably 0.53 to 0.6, most preferably 0.35 to 0.55 wt % styrene; from 0.05 to 0.5, preferably 0.6 to 0.3, most preferably from 0.085 to 0.2 wt % photoinitiator such as benzil dimethyl ketal solid available from The Sartomer Company, and from 2.0 to 12, preferably from 3 to 5 wt % monomer composition corresponding to CR-39 such as allyl diglycol carbonate available from Polysciences Corporation discussed above. The composition also includes from 1 to 9 drops, depending upon desired reactivity and darkness, and preferably 4–6 drops of photochromic material comprising photochromic dye dissolved in styrene as discussed above, added to 1 oz. of the mixture and enough mixture is made to cast a lens. The composition is mixed, heated at 115° F. for 20 minutes and mixed continuously to ensure complete dissolution of the crystals and other ingredients. The solution was cast in a conventional lens mold in a conventional manner and cured. The product was a one piece lens having a uniform composition throughout and a rapid reversible photochromism, i.e., a photochromic reversal rate in either direction (dark-light or light-dark) in the order of 15 seconds or less.

Imparting Scratch Resistance

CR-39 plastic ophthalmic lenses are relatively hard and scratch-resistant when compared to other plastic ophthalmic lenses. However, the scratch-resistance of CR-39 lenses is lower than that of glass. Accordingly, it may be desirable to apply scratch-resistant coatings to CR-39 and other plastic ophthalmic lenses. In the present invention, such an outer layer serves not only to impart scratch resistance, but also to seal in the photochromic pigments, e.g., in the case that the wafer lens is photochromic. A wide variety of coating techniques and materials have been proposed over the years for coating lenses with scratch resistant layers. These include applying coating solutions by spin, dip, spray or flow coating. An automatic apparatus for applying scratch-resistant coatings to plastic ophthalmic lenses is disclosed in U.S. Pat. No. 5,246,499 (Peralta et al).

The resulting lens may also be subjected to treatments frequently applied to plastic lenses, including without limitation tinting and coating with ultraviolet inhibitors and antireflection coatings, according to known methods.

Suitable materials and means for applying them are known in the art, including without limitation those disclosed in U.S. Pat. Nos. 4,758,448 and 4,544,572.

Particularly for lens manufacturing processes using UV curing, a yellow tint may remain in the resulting lens or may evolve during aging. This tendency to "yellowing" can be reduced by curing the lens material with the additional of certain anti-yellowing chemical agents. These include amine hindered amine light stabilizer (HALS); optical brighteners which makes the yellowing or hindered phenol antioxidants. Another method is to use a photosensitive initiator which is not from the amine group and which will not cause yellowing.

The invention described herein can include the use of UV inhibitors coated on the surface of a cured lens or absorbed into the surface of the cured lens to avoid any additional effect on the UV initiators and to substantially prevent or entirely eliminate the transmission of UV light waves into the lens.

Such UV inhibitors are well known in the art and need not be described in detail herein. It is desirable to have the UV inhibitors eliminate all UV light and other wavelengths having a wavelength of 500 nm or less and more specifically between 300–425 nm. This treatment process normally involves, after the curing steps, simply dipping the cured lens into a hot bath having any one of the coatings mentioned above to coat the surfaces significantly such that the entire surface of the lens is covered with the inhibitors. This dipping process, as well as other processes for applying the coatings noted above are well-known to those skilled in the art. The UV inhibitor can be used in solution or otherwise form a composition with the coating discussed above, such that the desired coating along with the inhibitor can be applied to the lens in a one step process. Some inhibitor may be absorbed into the lens material. Other known methods of coating can be used in applying he UV inhibitor in the manner described above.

Edging

The composite or laminate lens is then mounted on an edger in the normal manner and an edging process is carried out in order to provide a perimeter to the lens according to the frames in which the lens is to be mounted.

EXAMPLES

Example 1

This Example demonstrates a method for creating non-photochromic bifocal lens from an ophthalmic stock base lens of CR-39 polycarbonate or other high index material. A stock base lens of negative 200 was taken from the shelf with the objective of converting the stock base lens to a negative 200 with bifocal. The negative 200 stock base lens is a four curve.

Although the base lens is a "four curve", a "six curve" bifocal wafer-like lens 1 which is 0.5 mm in center thickness is created, though it could more easily be purchased from a supplier. The flat top bifocal wafer-like lens was made from bifocal molds. The front six base mold (UV transparent glass) having an indentation to form the bifocal sector and a back mold (UV transparent glass) are cleaned with 100% alcohol by hand. The front mold was then placed in a silicone gasket that had a 1 mm lip for progressive lenses and a 0.25 to 0.5 mm lip for all single vision and flat top lens-like wafers. Then, the back mold was placed in the gasket, forming a cavity of approximately 0.25 for the wafer lens. After a cavity is formed, a CR-39 base monomer is injected in the gasket to form the wafer lens. The gasket may also be lifted up and the mixture put into the cavity being careful that there are no air bubbles. This can be done by transferring the monomer into a 1 oz. bottle with a squeezable top that has a point like a syringe which is put into the mold so that the cavity can be filled with the monomer—this being a very thin layer. The wafer is six curve and not corrective or optically modifying except in the area of the bifocal. The area with the bifocal lens has the desired add power.

At this point the polymerizable monomer filled mold assembly was placed in a UV curing chamber. This curing process takes 10 to 20 seconds (depending upon whether the wafer lens is carrying a bifocal lens) and the small wafer-like lens will be fully cured at this time. The mold assembly is taken from the curing chamber and the gasket is removed. Then the front mold and back mold with the wafer lens or stock base lens layer of wafer lens sandwiched therebetween, which is now cured, is placed in a cool water bath for separation from the mold. This is done easily within a few seconds of it being immersed in the water.

Figure 1:
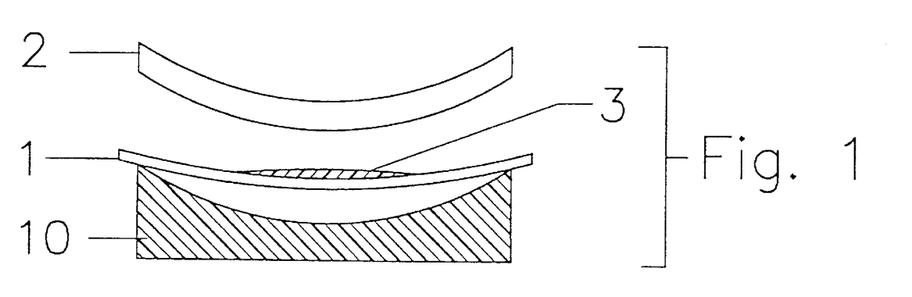
FIG. 1 is an exagerated diagram showing wafer lens with liquid photopolymerizable adhesive composition prior to seating of prescription base lens.

The thus produced wafer lens is cleaned by hand with alcohol and is next heated to about 200 degrees F. for about 2–5 minutes in a water bath to soften the lens and render it more pliable. The wafer lens 1 as shown in FIG. 1 is placed on top of a "four base" glass mold 10, the glass mold preferably also being heated, the wafer lens preferably oriented generally horizontally to present a saucer-like appearance with concave side facing upwards. The glass mold is supported on a base 11 which supports the mold 10 above a not-activated UV light source 12. Sixteen drops of Instacure IB-33 Adhesive 3 is then placed in the center of the wafer lens, with care being taken to ensure that there are no bubbles.

A preformed "four base" stock base lens 2 is cleaned with 99% ethyl alcohol as conventional in the industry, and the clean base lens is placed in the on top of the lens wafer and pushed against the wafer, with adhesive sandwiched between the lenses. A force of about 25 pounds is applied by weight 13 though diffuser 14 downwards against the top of the base lens 2, as a result of which (1) adhesive 3 is caused to spread evenly over the entire surface between the lenses 1, 2, and (2) the wafer lens 1 is caused to deform between the mold 10 and the stock base lens 2. Only a thin layer of adhesive as shown in FIG. 2 remains between the lenses 1, 2. The lenses are held tightly together during the adhesion/curing step wherein the lens composite was subjected to two low intensity UV lights, namely, 20 watt black lights from Sylvania Bulbs, placed 3 inches from the bottom of the mold of the lens assembly for 5 minutes as shown in FIG. 2. Etched glass panels were used as diffusers for dispersing the light emanating from the bulbs about the lens, mold and mold holder.

The product was a bifocal lens of which the curvature of the base lens was determined by the base lens, and wherein the curvature of the wafer lens adapted to and conformed to that of the base lens.

The amount of pressure needed to satisfactorily deform and adhere the wafer lens to the base lens is easily determined and depends upon thickness, temperature, and cure rate; however, a force of 25 lbs. was found to be generally satisfactory in all cases for achieving the desired effect.

Example 2

The procedure as in Example 1 is followed, except that 16 drops of a UV curable photochromic photopolymer adhesive were applied to the center of the back portion of the heated six curve wafer-like bifocal lens in the holder.

More specifically, in this Example a photochromic pigment and a monomeric composition were mixed to form a photochromic material, and a polymerizable monomer composition was separately mixed to provide adhesive properties, and these two compositions were mixed and applied to form the photochromic layer for adhering the wafer lens to the base lens.

As the photochromic pigment, Reversacal Plum Red, which is a trade name of Keystone Annalee Corporation, was employed. The photochromic pigment was found to be soluble in toluene, dichloromethane, chloroform, dimethylformamide, with was slightly soluble in alcohols and acetone. Four grams of this photochromic material was mixed in a sterile 6 oz. plastic beaker with 1 oz. of compatible monomer composition, namely, styrene (although vinylbenzene, phenylethylene or cinnamene would work equally well) at room temperature. The resulting semi-viscous solution is a photochromic composition for use in forming the photochromic layer.

The photochromic composition is not sufficiently adhesive by itself to adhere well to a CR-39 or other plastic lens. For durability under normal conditions of use, it is necessary to bond or fuse the photochromic material to the plastic substrate of the lens. This is done using a clear liquid photopolymerizable monomeric composition which in this Example was tripropylene glycol diacrylate containing a UV catalyst or photoinitiator as needed to induce the monomer to be cured under UV light. The photopolymerizable material with adhesive bonds with the CR-39 substrate. The photopolymerizable material (i.e., the tripropylene glycol diacrylate monomer mixed with UV catalyst) and the photochromic material are prepared separately and set aside in their respective sterile beakers.

When ready to adhere the wafer to the base lens, the photochromic liquid composition and the clear adhesive composition were mixed 16:1 by volume in a 1 oz. plastic beaker in a separate area and then this mixture was applied to the center of the up-turned concave surface of the wafer lens. The four curve stock −200 base lens was then laid on top of the wafer-like lens and 25 pounds of pressure were applied. This pressure was allowed to disperse the photopolymer adhesive over the entire surface between the two lenses and then the lens assembly was placed in the UV turn chamber and allowed to cure under the same conditions as in the previous Example. That is, the mold assembly was subjected to low intensity UV lights 3 inches from the bottom of the mold of the lens assembly for 5 minutes. Once curing had completed, the lens assembly was taken out and found to be a perfect photochromic plastic bifocal −200 lens. Since both curves—the curve of the wafer-like lens and the curve of the stock base lens without the bifocal—matched after adhesion, the photochromic adhesive formed a very uniform and very thin layer between the two lenses and it cured very quickly to form a bifocal from the original stock base lens.

When exposed to UV radiation the time required to darken the lens is approximately 5 seconds. This is surprising, given that the time for measuring lens darkening of conventional lenses is given in minutes. It is presumed that this effect is attributable to the photochromic pigments being present in front of the UV absorbent containing base lens as compared to conventional photochromic lenses, so as to be more receptive to the ambient UV radiation.

Example 3

This Example created a rapid reaction photochromic lens from a CR-39 three curve stock base ophthalmic lens.

The stock base lens selected for the Example was a three curve while the non-corrective wafer-like lens was a six curve. All wafer-like lenses (i.e., lenses not provided with bifocal segments) have no power because they are formed with curves precisely matching on the front and back molds. The result is a wafer lens that has no power but is very precise, very even in thickness, and very thin. The stock base three curve lens was cleaned with 100% alcohol by hand and then the six curve wafer was also cleaned with 100% alcohol by hand. The lens and wafer were placed on a clean table and then the wafer was placed concave side up. In a sterile 1 oz. beaker a mixture of 16 drops of the photopolymer adhesive was combined with 1 drop of the photochromic material as described above, and the photopolymer and photochromic material were mixed with a sterile plastic stirrer until the mixture was uniform in color and any bubbles had dissipated, producing a photochromic photopolymerizable composition. This composition was placed in the concave surface of the wafer, making sure there were no bubbles, which was then laid on top of a six curve glass mold. The stock base lens that precisely matched the concave curve of the glass mold was placed in or on top of the adhesive containing thin wafer. Pressure was applied to the stock base lens sufficiently to disperse the mixture in between the surfaces of the convex surface of the stock base lens and the concave surface of the wafer and to cause the pre-heated and softened wafer lens to conform to the base lens. Next, this lens assembly is placed in the UV curing chamber for 5 minutes under the same conditions as in previous examples.

When the lens was removed it was found to be photochromic and to have the power that was selected from the stock base. It was also found to be scratch resistant. The photochromic material was locked in due to the effect of the sandwiching of the two lenses.

Example 4

The following illustrates the casting of a complete, one piece photochromic wafer lens according to the present invention.

The following ingredients were obtained:

Monomer: Tripropylene glycol diacrylate SR-306, available from The Sartomer Company Additives: Styrene Benzil dimethyl ketal solid (photoinitiator) available from The Sartomer Company
Allyl diglycol carbonate (CR-39 monomer) available from Polysciences Corporation One quart of monomer was prepared by mixing the following ingredients:

1,098 grams SR-306 by weight 32.4 grams CR-39 by weight 1.85 grams Photoinitiator by weight 5.45 grams Styrene by weight The solution was mixed and had a final weight of 1137.70 grams liquid.

The solution was then heated at 115° F. for 20 minutes and mixed continuously to ensure complete dissolution of the crystals and other ingredients.

The solution was cast in a conventional lens mold in a conventional manner and cured. The product was a one piece wafer lens having a uniform composition throughout, including having photochromic material dispersed uniformly throughout. This wafer lens was adhered to a clear stock base lens using conventional adhesive in the manner set forth in Example 1, and was found to have a photochromic reversal rate in either direction (dark-light or light-dark) in the order of 15 seconds or less.

Example 5

The lens produced in Example 4 was further lightly tinted to adjust the residual or inactive state photochromic color to be desired shade.

To achieve a brown active state, the lens was tinted for 1 second in Chemko Pink followed by dipping for four seconds in Chemko Dark Brown at 90°–95° C., followed by rinsing and cleaning. This lens, tinted with non-photochromic water soluble dyes, produced a lens which was darker than a mere photochromic lens, and had an acceptable attractive color. The lens is darker than a lens which would normally be worn indoors, but was perfect for use as a sunglasses lens.

Any worker in this art, having the photochromic lenses according to the present invention at hand, would be able to further tint the lenses to produce a range of sun glass colors and darknesses by either adding pigment into one or more of the non-photochromic or photochromic layers according to the invention, or by tinting the photochromic lens in an aqueous tint bath to impregnate water soluble dyes into the photochromic or other lens layer.

Example 6

Example 6 illustrates the remolding process for creating a progressive bifocal, which is an invisible bifocal from a single vision CR-39 or other plastic substrate lens.

The process of Example 1 is repeated, except that the bifocal (sharp edge) mold is replaced with a progressive mold.

Example 7

This Example serves to illustrate that even a scratched stock base lens or lens from the patient's frame can be treated remove the scratches and to simultaneously make that particular lens photochromic.

In this Example, the process of Example 1 is repeated exactly, except that the edged scratched lens of a patient was removed from the spectacles and placed into a mold that matches the curve the patient's lens. Then, a six curve wafer lens, which did not match the curvature of the prescription lens, was heat treated and adhered to the base prescription lens.

The above examples were presented in order to illustrate the invention and are not intended to limit the invention in any way. Those working in the art would readily appreciate that substantial modifications within the scope of the invention may be made to the illustrative embodiments.

The term ophthalmic lens as used herein is intended to mean any lens of a optical quality transparent material intended to be worn by the user. The term can refer to reading glasses, nonprescription sun glasses, safety glasses, driving glasses, etc. and is not limited to prescription glasses.

Although the system was first designed for providing a method of rendering prescription plastic lenses photochromic, the invention has been described in great detail using a CR-39 lens by way of example, it will be readily apparent that the process is capable of application to related applications, such sun glasses, safety glasses, driving glasses, etc., and is thus capable of use in a number of other applications. Although this invention has been described in its preferred form with a certain degree of particularity with respect to modification of a CR-39 lens, it is understood that the present disclosure of the preferred form has been made only by way of example and that numerous changes in the details of structures and the composition of the system may be resorted to without departing from the spirit and scope of the invention.

What is claimed is:

1. A method of making a composite lens comprising the steps of:

(a) pre-manufacturing a first lens and a second lens, each of said first and second lenses having first and second sides;

(b) orienting said first lens in a plane with one side facing upwardly;

(c) applying a small amount of a polymerizable adhesive to the upward facing side of said first lens;

(d) orienting said second lens in a plane substantially parallel to the plane of said first lens; and (e) bringing said first and second lenses together such that the space between said first and second lenses is completely filled with said polymerizable adhesive material which forms an adhesive layer;

wherein one of said first and second lenses is a wafer lens and the other of said lenses is a base lens, wherein the surface area or diameter of the wafer and base lenses are essentially the same, wherein the curvature of sides of the wafer lens and base lens to be adhered are different curvatures, wherein said wafer lens is heated prior to step (e), and wherein the curvature of the sides of the wafer lens and base lens to be adhered match after step (e).

2. A method as in claim 1, wherein said polymerizable adhesive further includes a photochromic pigment.

3. A method as in claim 1, wherein the thickness of said adhesive layer is between 0.25 and 1.0 mm.

4. A method as in claim 1, wherein the composition of said wafer lens is selected from the group consisting of diethylene glycol diallyl carbonate, allyl diglycol carbonates, allylic esters, acrylic esters, acrylates, methyl, allyl and butyl methacrylates, polycarbonates, styrenics, polyesters, allyl diglycol carbonates, triallyl cyanurate, triallyl phosphate, triallyl citrate, diallyl phenyl phosphonate, urethanes, epoxies and silicones.

5. A method as in claim 2, wherein said mixture comprising a photochromic pigment and a polymerizable adhesive further comprises a photopolymerization initiator.

6. A method as in claim 2, wherein said photochromic pigment is a reversible photochromic naphthopyran compound.

7. A method as in claim 2, wherein said photochromic pigment is dissolved or dispersed in a styrenic monomer prior to mixing with said polymerizable adhesive.

8. A method as in claim 7, wherein said styrenic monomer is selected from the group consisting of styrene, vinylbenzene, phenylethylene, and cinnamene, and mixtures thereof.

9. A method as in claim 1, wherein said polymerizable adhesive is tripropylene glycol diacrylate.

10. A method as in claim 1, wherein said method further includes a step of providing a layer of a scratch resistant coating.

11. A method as in claim 1, wherein said wafer lens is a bifocal lens.

12. A method as in claim 1, wherein said wafer lens is a progressive focal lens.

13. A method of claim 1, wherein the difference in curvature between the facing sides of the first and second lenses prior to adhesion is at least 1 diopter.

14. A method as in claim 1, wherein said composite lens is tinted.

15. A method as in claim 1, wherein said base lens is formed of an optical quality polycarbonate resin.

16. A method as in claim 1, wherein said base lens is formed of allyl diglycol carbonate.

17. A method as in claim 1, wherein at least one of said lenses is a photochromic plastic eyeglass lens cast from a tripropylene glycol diacrylate composition further comprising:

from 0.3 to 1.0 wt % of a styrene monomer;

from 0.05 to 0.5 wt % photoinitiator;

from 2.0 to 12 wt % allyl diglycol carbonate monomer; and sufficient photochromic dye to render said lens photochromic.

18. A method as in claim 17, wherein said tripropylene glycol diacrylate composition comprises:

from 0.53 to 0.6 wt % of a styrene monomer;

from 0.06 to 0.3 wt % photoinitiator;

from 2.0 to 12 wt % allyl diglycol carbonate monomer; and sufficient photochromic dye to render said lens photochromic.

19. A method as in claim 17, wherein said tirpropylene glycol diacrylate composition comprises:

from 0.5 to 0.55 wt % of a styrene monomer;

from 0.085 to 0.2 wt % photoinitiator;

from 3 to 5 wt % ally diglycol carbonate monomer; and sufficient photochromic dye to render said lens photochromic.

20. A method as in claim 17, wherein said styrene monomer is selected from the group consisting of styrene, vinylbenzene, phenylethylene or cinnamene or mixtures thereof.

* * * * *